(No Model.)
J. WILL.
GRAIN METER.
No. 319,160. Patented June 2, 1885.
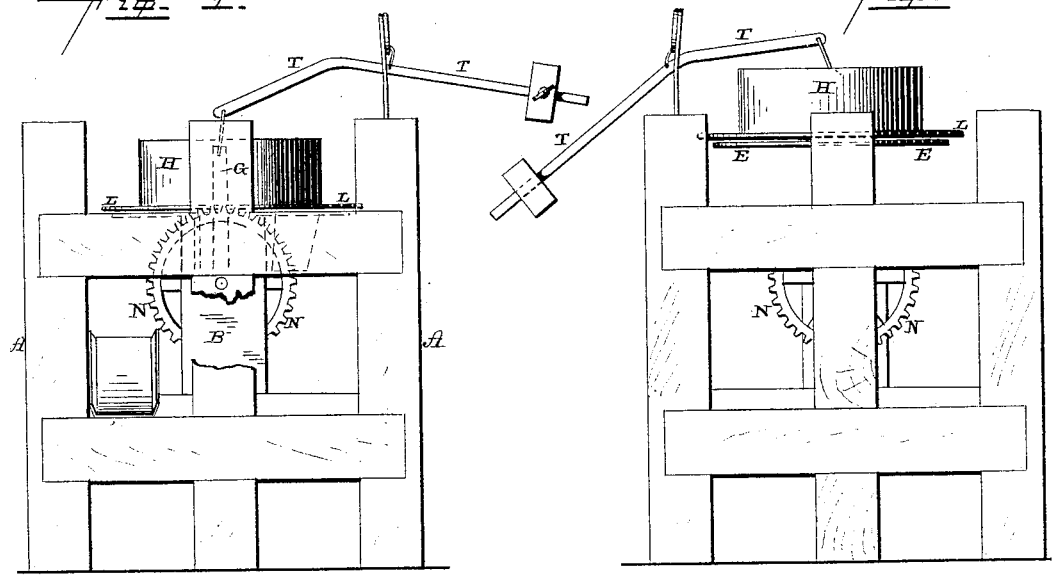
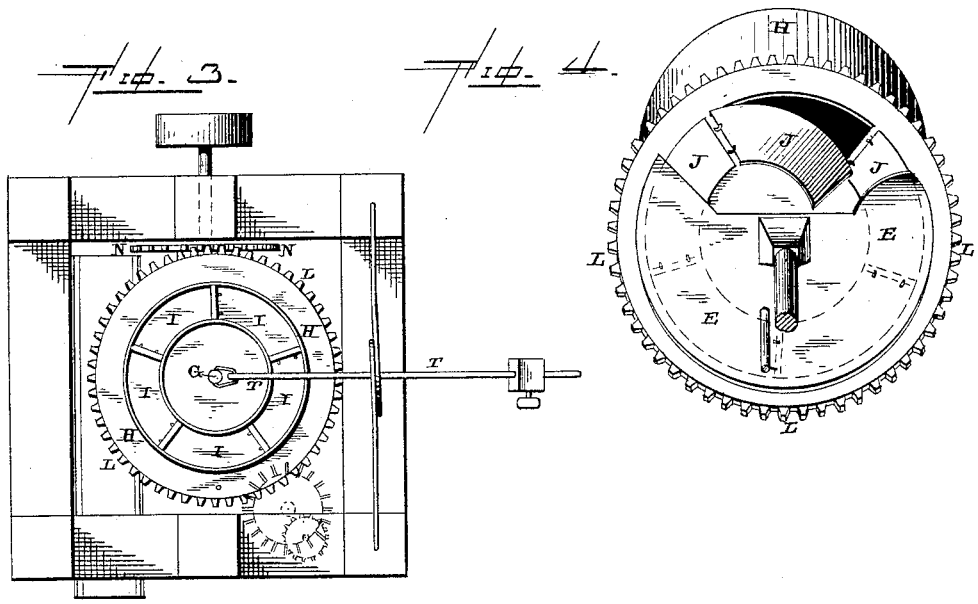
Witnesses.
R. F. Gardner
L. L. Burket
Inventor.
Jno. Will,
per F. A. Lehmann,
atty

UNITED STATES PATENT OFFICE.

JOHN WILL, OF AUDUBON, IOWA.

GRAIN-METER.

SPECIFICATION forming part of Letters Patent No. 319,160, dated June 2, 1885.

Application filed March 19, 1885. (No model.)

*To all whom it may concern:*

Be it known that I, JOHN WILL, of Audubon, in the county of Audubon and State of Iowa, have invented certain new and useful Improvements in Grain-Meters; and I do hereby declare the following to be a full, clear, and exact description of the invention, such as will enable others skilled in the art to which it pertains to make and use it, reference being had to the accompanying drawings, which form part of this specification.

My invention relates to improvements in grain-meters; and it consists, first, in the combination of a vertically moving and revolving frame, which is provided with a suitable number of compartments, each one of which is provided with a hinged bottom, a stationary plate, which is cut away on one side, and upon the top of which the revolving frame moves, a spring or counter-weight for keeping the frame raised upward until a suitable regulated amount of grain has been run into one of the compartments, and a driving-wheel which meshes with the teeth upon the outer edge of the revolving frame; second, in the arrangement and combination of parts, which will be more fully described hereinafter.

The object of my invention is to have the frame, which is divided into compartments, held in a raised position out of contact with the driving mechanism until the regulated amount of grain has been poured into one of the compartments, when the frame sinks downward from the weight of the grain, so as to come in contact with the driving-wheel, when the frame is made to revolve just far enough to discharge the grain from the compartment, and at the same time move another compartment under the spout.

Figures 1 and 2 are side elevations showing the revolving frame in different positions. Fig. 3 is a plan view of the same. Fig. 4 is a detail view.

A represents a suitable frame-work, in or near the center of which is placed the standard B, and upon the top of this standard is placed the plate E, which is cut away upon one side, as shown. This plate has no movement except a rising and falling one upon the top of the standard, as it is not intended that it shall revolve with the frame at any time. Rising above the top of this plate is the pivot G, around which the frame H revolves. This frame has a number of compartments, I, formed around its edges, and each compartment is provided with a hinged bottom, J, which drops downward when each one is brought in succession over the cut-away portion of the plate E. Upon the outer lower edge of the revolving frame are formed teeth L, which are made to mesh with the driving-wheel N, which is kept constantly revolving while the grain is being measured.

Connected to the pivot, which is rigidly secured to the plate E, is a weighted lever, T, by means of which the revolving frame and the cut-away plate E are held in a raised position until a certain regulated amount of grain is poured into one of the compartments of the frame, when the frame and plate E at once sink downward upon the top of the standard, in which position the teeth upon the revolving frame are brought in contact with the teeth of the driving-wheel, when the frame is made to revolve upon the top of the plate E until that compartment which was filled with grain is brought over the cut-away portion of the plate E, when the hinged bottom, being no longer supported in position, drops downward and discharges the grain into the trough, which is placed to receive it. As soon as this compartment is emptied the frame at once rises out of contact with the driving-wheel, and ceases to revolve. In the meantime another compartment has been moved under the spout through which the grain is running, so that the grain is emptied into another compartment. As soon as this compartment is filled, or the regulated amount of grain is reached, then the frame sinks downward and again revolves.

If so desired, a spring may be used instead of the weighted lever for forcing the plate E and the revolving plate upward. A registering mechanism of any kind is to be connected to this frame, so as to register the amount of grain that is measured by it.

Having thus described my invention, I claim—

1. The combination of a vertically-moving and horizontally-revolving frame divided into compartments, a counter-weight, and driving-wheel, substantially as shown.

2. The combination of a vertically moving and revolving frame divided into compartments and provided with hinged bottoms and the plate E, which is cut away on one side, a counter-weight which raises both the plate and frame upward, and a driving-wheel for causing the frame to revolve when it sinks downward, substantially as described.

In testimony whereof I affix my signature in presence of two witnesses.

JOHN WILL.

Witnesses:
 L. D. PHELPS,
 B. S. PHELPS.